US011860565B2

(12) United States Patent
Imamura et al.

(10) Patent No.: US 11,860,565 B2
(45) Date of Patent: Jan. 2, 2024

(54) RESTRICTING MEMBER, DEVELOPING DEVICE, PROCESS CARTRIDGE, AND IMAGE FORMING APPARATUS

(71) Applicant: CANON KABUSHIKI KAISHA, Tokyo (JP)

(72) Inventors: Issei Imamura, Shizuoka (JP); Ryohei Tsutsumi, Shizuoka (JP); Yuichiro Hirata, Shizuoka (JP); Takuya Oka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/848,276

(22) Filed: Jun. 23, 2022

(65) Prior Publication Data

US 2022/0413425 A1 Dec. 29, 2022

(30) Foreign Application Priority Data

Jun. 25, 2021 (JP) ................................ 2021-106016

(51) Int. Cl.

*G03G 21/00* (2006.01)
*G03G 21/16* (2006.01)
*G03G 21/18* (2006.01)
*G03G 15/08* (2006.01)

(52) U.S. Cl.

CPC ..... *G03G 21/0029* (2013.01); *G03G 21/1647* (2013.01); *G03G 21/1814* (2013.01); *G03G 21/1839* (2013.01); *G03G 15/0812* (2013.01)

(58) Field of Classification Search

CPC ........... G03G 21/0029; G03G 21/1647; G03G 21/1814; G03G 21/1839; G03G 15/0812; G03G 2215/0866

See application file for complete search history.

(56) References Cited

U.S. PATENT DOCUMENTS 5,220,129 A * 6/1993 Nishio .............. G03G 15/0812 399/284
5,552,867 A * 9/1996 Sekino .............. G03G 15/0812 399/284

(Continued)

FOREIGN PATENT DOCUMENTS

JP H07239611 A 9/1995
JP H09329960 A 12/1997

(Continued)

*Primary Examiner* — Sandra Brase

(74) *Attorney, Agent, or Firm* — Canon U.S.A., Inc. I.P. Division

(57) ABSTRACT

A restricting member includes a blade portion and a supporting portion. A contact portion is provided at the blade portion, and, in a cross section orthogonal to a longitudinal direction, the contact portion includes a first portion extending in a first direction and a second portion extending toward a free end from an end of the first portion and extending in a second direction. When a region demarcated by connecting an intersection point, the end of the first portion, and an end of the second portion by a straight line is defined as a first region, the intersection point being where an imaginary line intersects an extension line of the first portion in the first direction, an area of the first region is smaller on a longitudinal end portion than on a longitudinal central portion of the blade portion.

15 Claims, 11 Drawing Sheets

(56) References Cited

U.S. PATENT DOCUMENTS

| | | | | |
|---|---|---|---|---|
| 5,895,151 | A * | 4/1999 | Kinoshita .......... | G03G 15/0812 399/284 |
| 6,229,979 | B1 * | 5/2001 | Ishii .................. | G03G 15/0812 399/284 |
| 6,360,068 | B1 * | 3/2002 | Kinoshita .......... | G03G 15/0812 399/284 |
| 2001/0026715 | A1 | 10/2001 | Tatsumi | |
| 2016/0252869 | A1 | 9/2016 | Hagimoto | |

FOREIGN PATENT DOCUMENTS

| | | | |
|---|---|---|---|
| JP | H09329961 | A | 12/1997 |
| JP | 11327395 | A | 11/1999 |
| JP | 2007264260 | A | 10/2007 |
| JP | 2013200551 | A | 10/2013 |

* cited by examiner

RESTRICTING MEMBER, DEVELOPING DEVICE, PROCESS CARTRIDGE, AND IMAGE FORMING APPARATUS

BACKGROUND OF THE INVENTION

Field of the Invention

The present invention relates to an image forming apparatus, and a restricting member, a developing device, or a process cartridge, each of which is used in the image forming apparatus. In particular, the present invention to an electrophotographic image forming apparatus using an electrographic method and a restricting member, a developing device, or a process cartridge, each of which is used in the electrophotographic image forming apparatus.

Description of the Related Art

Hitherto, in an image forming apparatus, toner carried by a developing roller is such that the thickness of a toner layer is restricted by a developing blade.

Japanese Patent Laid-Open No. H09-329961 (Patent Literature 1 (PTL 1)) proposes a structure that prevents the thickness of a toner layer from becoming too large at a developing blade that restricts the thickness of the toner layer. Specifically, PTL 1 discloses a structure that forms a "cutout" in a free end of the developing blade that contacts a developing roller so that the free end becomes continuously shorter toward an end portion side from a central side in a longitudinal direction of the developing blade.

Regarding known image forming apparatuses having developing blades, two end portions of a developing blade may need to be cut to form a "cutout" in the free end of the developing blade. Since a cut piece to be discarded is produced when cutting the developing blade, the efficiency of use of a raw material may be reduced.

SUMMARY OF THE INVENTION

The present invention provides a structure that is designed to increase the uniformity in a longitudinal direction of a developer layer that is carried by a developer carrying member while the efficiency of use of a raw material at the time of manufacturing is increased.

A developing device according to the present invention is a developing device including a developer carrying member configured to carry a developer; and a restricting member configured to restrict a thickness of a layer of the developer on the developer carrying member, wherein the restricting member includes a blade portion that extends in a longitudinal direction, and a supporting portion that supports a first end portion of the blade portion in a transverse direction orthogonal to the longitudinal direction, wherein a contact portion for contacting a surface of the developer carrying member is provided at a second end portion opposite to the first end portion in the transverse direction, which includes a free end, of the blade portion in the transverse direction, wherein, in a cross section orthogonal to the longitudinal direction, the contact portion includes a first portion that extends in a first direction along the transverse direction and that contacts the developer carrying member, and a second portion that extends toward the free end from an end of the first portion on a side of the free end in a second direction intersecting the first direction so that the second portion is farther away from the surface of the developer carrying member as goes toward the free end, and wherein, when a region demarcated by connecting an intersection point, the end of the first portion, and an end of the second portion on a side of the free end in the second direction by a straight line is defined as a first region, the intersection point being where an imaginary line that is orthogonal to the first direction and that passes through the end of the second portion intersects an extension line of the first portion in the first direction, in the longitudinal direction of the blade portion, an area of the first region on a longitudinal end portion of the blade portion is smaller than an area of the first region on a longitudinal central portion of the blade portion.

Further features of the present invention will become apparent from the following description of exemplary embodiments with reference to the attached drawings.

DESCRIPTION OF THE EMBODIMENTS

Exemplary embodiments of the present invention are described below with reference to the drawings.

Note that, for example, the dimensions, the materials, the shapes, and relative arrangements of structural components described in the embodiments below are each one example, and do not limit the scope of the present invention.

Structure of Image Forming Apparatus

Next, an image forming apparatus 100 according to an embodiment is described with reference to FIG. 7.

Figure 7:
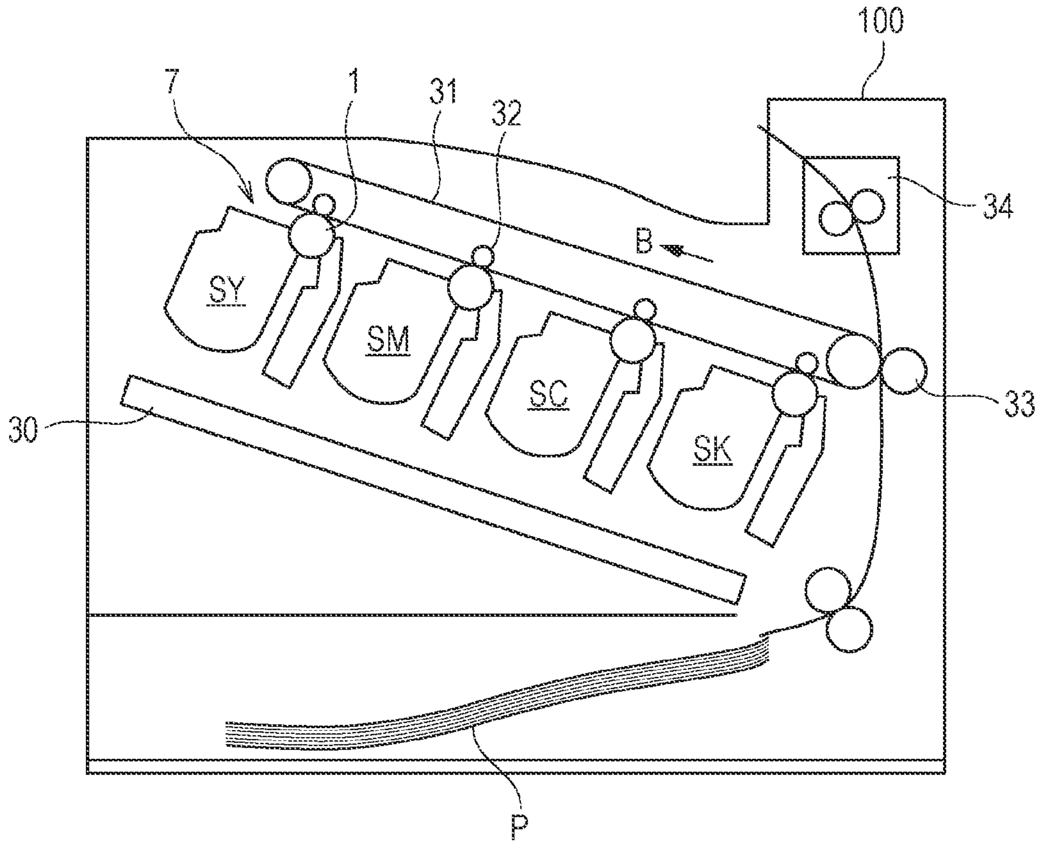
FIG. 7 is a vertical sectional conceptual view of an image forming apparatus according to an embodiment of the present invention.

FIG. 7 is a vertical sectional conceptual view of the image forming apparatus according to an embodiment of the present invention.

Specifically, FIG. 7 shows a cross section of the image forming apparatus 100 including process cartridges according to the present embodiment.

The image forming apparatus 100 of the present embodiment is a full-color laser beam printer using an in-line method or an intermediate transfer method. The image forming apparatus 100 is capable of forming a full-color image on a transfer material (such as a recording sheet, a plastic sheet, or a cloth) in accordance with image information. The image information is input to an image reading device connected to a main body of the image forming apparatus, or to the main body of the image forming apparatus from a host device of, for example, a personal computer connected to the main body of the image forming apparatus so as to be capable of communication therewith.

The image forming apparatus 100 includes process cartridges 7 each constituting a corresponding one of a plurality of image forming devices (SY, SM, SC, SK). The image forming devices are each provided for a corresponding one of yellow (Y), magenta (M), cyan (C), and black (K), and can each form an image of the corresponding one of the colors (Y, M, C, K). In the present embodiment, the image forming devices (SY, SM, SC, SK) are disposed in a row in a direction intersecting a vertical direction.

Note that the process cartridges 7 are each attached to and detached from the image forming apparatus 100 via a mounting device, such as a mounting guide or a positioning member, provided at the main body of the image forming apparatus. In the present embodiment, the color process cartridges 7 all have the same shape, and each of yellow (Y) toner, magenta (M) toner, cyan (C) toner, and black (K) toner is stored inside a corresponding one of the color process cartridges 7. Although, in the present embodiment, the process cartridges are described as being attached and detached, developing units (developing devices) may be configured so as to be attached to and detached from the main body of the image forming apparatus.

Photosensitive drums 1 are each rotationally driven by a driving device (driving source) that is not shown. A scanner unit (exposure device) 30 is disposed near the photosensitive drums 1. The scanner unit 30 is an exposure unit that irradiates the photosensitive drums 1 with laser and forms electrostatic latent images on the photosensitive drums 1 on the basis of image information.

The surface potential (bright potential) of each photosensitive drum 1 after exposure in the present embodiment is set to become −100 V. An intermediate transfer belt 31, serving as an intermediate transfer body, for transferring the toner images on the photosensitive drums 1 to a transfer material P (recording material) are disposed so as to oppose four photosensitive drums 1.

The endless intermediate transfer belt 31, serving as an intermediate transfer body, contacts all of the photosensitive drums 1, and moves by circulating (rotates) in the direction of the illustrated arrow B (counterclockwise direction).

Four primary transfer rollers 32, serving as primary transfer devices, are disposed in parallel on an inner peripheral surface side of the intermediate transfer belt 31 so as to oppose a corresponding one of the photosensitive drums 1. A bias having a polarity opposite to a normal charge polarity of toner is applied to the primary transfer rollers 32 from a primary transfer bias power supply (high-voltage power supply), serving as a primary transfer bias applying device (not shown). Therefore, the toner images on the photosensitive drums 1 are transferred (primary-transferred) to the intermediate transfer belt 31.

A secondary transfer roller 33, serving as a secondary transfer device, is disposed on an outer peripheral surface side of the intermediate transfer belt 31. A bias having a polarity opposite to a normal charge polarity of toner is applied to the secondary transfer roller 33 from a secondary transfer bias power supply (high-voltage power supply), serving as a secondary transfer bias applying device (not shown). Therefore, the toner images on the intermediate transfer belt 31 are transferred (secondary-transferred) to the transfer material P.

For example, when forming a full-color image, the above-described process is successively performed at the image forming units SY, SM, SC, and SK, and the toner images of the respective colors are successively superimposed upon each other on the intermediate transfer belt 31 and are primary-transferred thereto. Then, in synchronism with the movement of the intermediate transfer belt 31, the transfer material P is conveyed to a second transfer portion. Due to the action of the second transfer roller 33 in contact with the intermediate transfer belt 31 via the transfer material P, the toner images of the four colors on the intermediate transfer belt 31 are secondary-transferred all together to the transfer material P.

The transfer material P to which the toner images have been transferred is conveyed to a fixing device 34, serving as a fixing unit. The toner images are fixed to the transfer material P by applying heat and pressure to the transfer material P at the fixing device 34.

Structure of Process Cartridges

The overall structure of the process cartridges 7 that are mounted on the image forming apparatus according to an embodiment is described.

Figure 6:
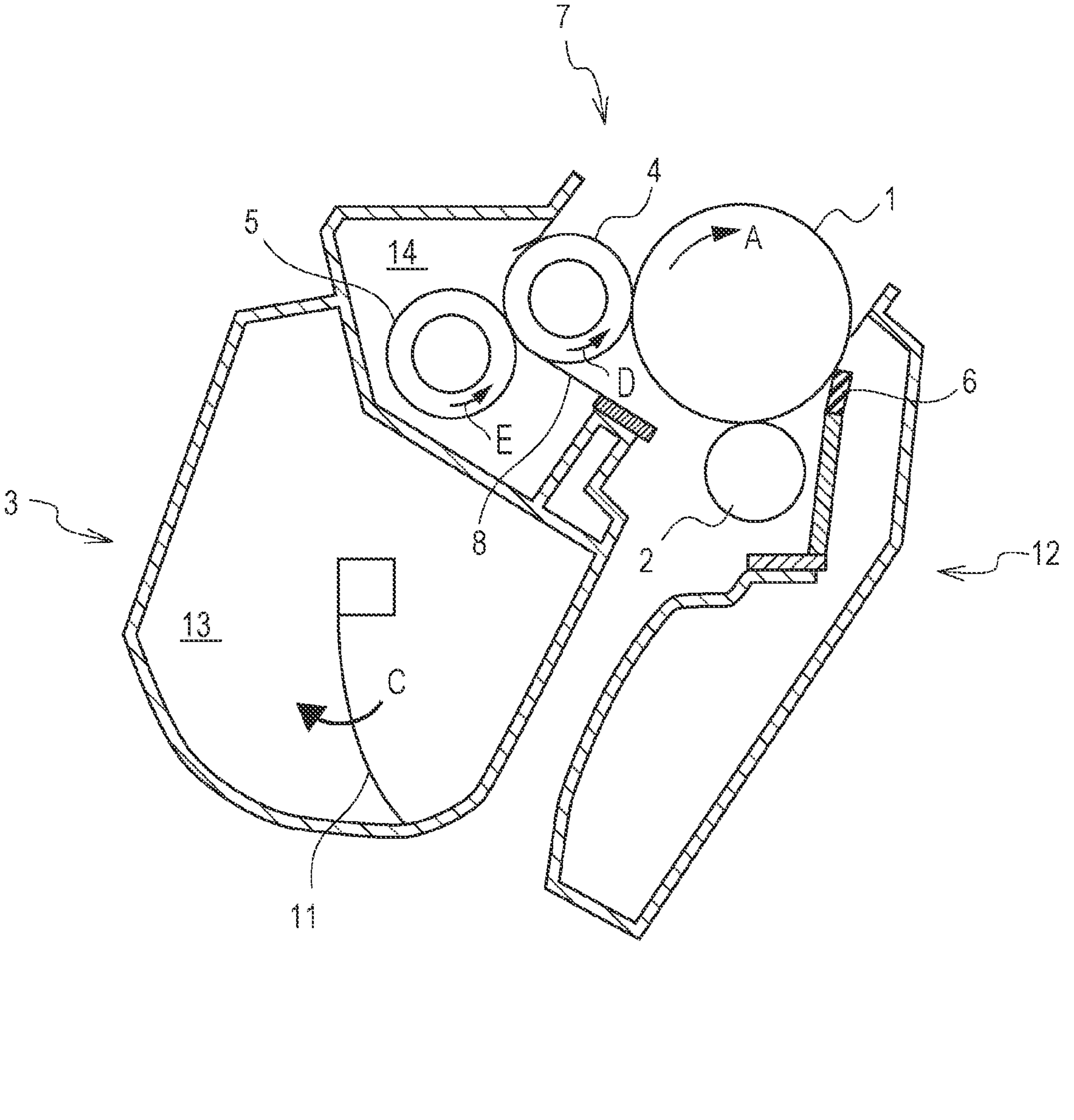
FIG. 6 is a vertical sectional conceptual view of a process cartridge according to an embodiment of the present invention.

FIG. 6 is a vertical sectional conceptual view of a process cartridge according to an embodiment of the present invention.

Specifically, FIG. 6 shows a main cross section of a process cartridge 7 of the present embodiment when seen in a longitudinal direction (rotational axis direction) of a photosensitive drum 1. Note that, in the present embodiment, the structures and the operations of the process cartridges 7 for the respective colors are substantially the same, except that the type (color) of developer that they store differs.

The process cartridge 7 includes a photosensitive unit 12 including, for example, the photosensitive drum 1, and a developing unit 3 (developing device) including, for example, a developing roller 4 (developer carrying member).

The photosensitive drum 1 is rotatably attached to the photosensitive unit 12 via a bearing (not shown). The photosensitive drum 1 is subjected to a driving force of a driving motor, serving as a driving device (driving source) that is not shown, and is thus rotationally driven at a speed of 300 mm/sec in the direction of illustrated arrow A in accordance with an image forming operation.

A charging member (charging roller) 2 for charging the photosensitive drum 1 and a cleaning member 6 are disposed at the photosensitive unit 12 so as to contact a peripheral surface of the photosensitive drum 1.

The charging member 2 is configured to be rotated by the rotation of the photosensitive drum 1, and can be applied with a voltage by a voltage applying device (not shown).

The charging roller 2 is formed by successively stacking a conductive elastic layer and a high-resistance layer on a metal core in a length of 232 mm in a longitudinal direction. Specifically, a conductive elastic layer made of urethane rubber having a thickness of approximately 3 mm is formed around a metal core having a diameter of 6 mm and a length of 240 mm in the longitudinal direction. Then, a high-resistance layer in which carbon black is dispersed in urethane rubber having a thickness of a few μm is formed on the elastic layer.

Two end portions of the metal core of the charging roller 2 are rotatably supported by a conductive supporting member, and, further, the supporting member is urged so as to be moved by a spring member in the direction of the photosensitive drum 1.

Therefore, the charging roller 2 is pressure-contacted against the photosensitive drum 1 by a predetermined pressing force in opposition to the elasticity of the conductive elastic layer, so that a charging nip portion is formed. The charging roller 2 contacts the photosensitive drum 1 and is rotated by the rotation of the photosensitive drum 1.

Then, a direct current voltage is applied to the charging roller 2 via the metal core by a power supply, and the surface of the photosensitive drum 1 is uniformly charged. In the present embodiment, a charging bias is applied so that the surface potential of the photosensitive drum 1 during the formation of an image becomes −500 V.

The cleaning blade 6 has a structure in which a SUS sheet metal and a rubber tip that is elastic at an end (free end) of the sheet metal press-contact each other in a length of 250 mm in a longitudinal direction. An end of the rubber tip of the cleaning blade 6 contacts the photosensitive drum 1 at a desired angle and a desired inroad amount (distance).

In order to ensure good cleaning performance, the contact pressure of the cleaning blade 6 with respect to the surface of the photosensitive drum 1 is approximately 80 g/cm. Residual toner on the surface of the photosensitive drum 1 is removed by such a cleaning blade structure.

The developing roller 4, serving as a developer carrying member, that contacts the photosensitive drum 1 and that rotates in the direction of illustrated arrow D (counterclockwise direction) is provided at the developing unit 3. The developing roller 4 is a semiconductive elastic body formed of a low-hardness rubber material, such as silicone or urethane, or a low-hardness rubber material foam, or a combination thereof. The low-hardness rubber material and the foam have a conducting agent, such as carbon, dispersed therein, and have a volume resistivity of $10^2$ Ωcm to $10^{10}$ Ωcm. The elastic body has an outside diameter of 20 mm, and a length of 235 mm in a longitudinal direction. The developing roller 4 contacts the photosensitive drum 1 with a required contact pressure.

In the present embodiment, the developing roller 4 and the photosensitive drum 1 rotate so that their surfaces move in the same direction (from the bottom toward the top in the present embodiment) at an opposing portion (contact portion). During the formation of an image, a voltage (hereunder referred to as a developing bias) is applied to the developing roller 4 by a voltage applying device (not shown). In the present embodiment, the developing bias during the formation of an image is such that a direct current voltage of −350 V is applied.

A developer supply roller 5 (hereunder simply referred to as "supply roller"), serving as a device for supplying and collecting a developer, that rotates in the direction of illustrated arrow E (counterclockwise direction) is disposed at the developing unit 3. Here, the supply roller 5 contacts a peripheral surface of the developing roller 4. The supply roller 5 is an elastic roller formed from, for example, an elastic body, and, in the present embodiment, an insulating sponge roller having an outside diameter of 16 mm and a length of 220 mm in a longitudinal direction is disposed where it contacts the developing roller 4. The supply roller 5 and the developing roller 4 rotate so that their surfaces move in opposite directions at an opposing portion (contact portion).

A developing blade 8 (restricting member) that contacts the peripheral surface of the developing roller 4, and scrapes, makes uniform, and restricts the thickness of a toner layer is provided at the developing unit 3. The developing blade 8 includes a thin plate 81 (blade portion) and a supporting plate 82 (supporting portion), both of which extend in a longitudinal direction A1 described below. One end 81*a* (fixed end) of the thin plate 81 in a transverse direction A2 orthogonal to the longitudinal direction is fixed to the supporting plate 82, and the other end 81*b* is a free end and includes a contact portion 810 (described below).

The thin plate 81 is formed of SUS (stainless steel) processed into the form of a leaf spring and has a thickness of 80 μm and a length of 230 mm in the longitudinal direction. The contact portion 810 that is positioned at the free end (the other end 81*b*) of the thin plate 81 contacts the developing roller 4 with a required contact pressure.

Toner supplied to the developing roller 4 has its layer thickness restricted by the developing blade 8, and a thin toner layer to which an electric charge is applied by triboelectric charging is formed on the developing roller 4. The toner is supplied to a developing region as the developing roller 4 rotates.

Toner still being carried by the developing roller 4 without contributing to a developing operation is removed from the developing roller 4 due to rubbing by the supply roller 5. Part of the toner that has been removed is supplied again, together with new toner supplied to the supply roller 5, to the developing roller 4 by the supply roller 5, and the remaining toner is returned into and collected inside a toner storage chamber 13. In this way, in the present embodiment, the supply roller 5 has two functions, that is, the function of supplying toner and the function of collecting toner.

The toner storage chamber 13, serving as a developer storage chamber, stores a developer (toner) having a particle diameter of 7 μm. A rotatably supported toner conveying member 11 is provided inside the toner storage chamber 13. Note than, in the present embodiment, the developer is a nonmagnetic one-component developer.

The toner conveying member 11 stirs the toner stored inside the toner storage chamber 13, and conveys the toner toward a developing chamber 14 where the developing roller 4 and the supply roller 5 are provided. The developing chamber 14 has a developing opening having a length of 226 mm in a longitudinal direction as an opening portion for conveying the toner to the outside of the developing unit 3. The developing roller 4 is assembled to the developing unit 3 in an arrangement that closes the developing opening.

Note that the present embodiment is applicable to a structure serving as a developer container (toner cartridge) having only the toner storage chamber 13 and the toner conveying member 11 and being attached to and detached from the main body of the apparatus.

Structure of Restricting Member

Next, the developing blade 8 (restricting member) according to an embodiment is described in detail.

Figure 2A:
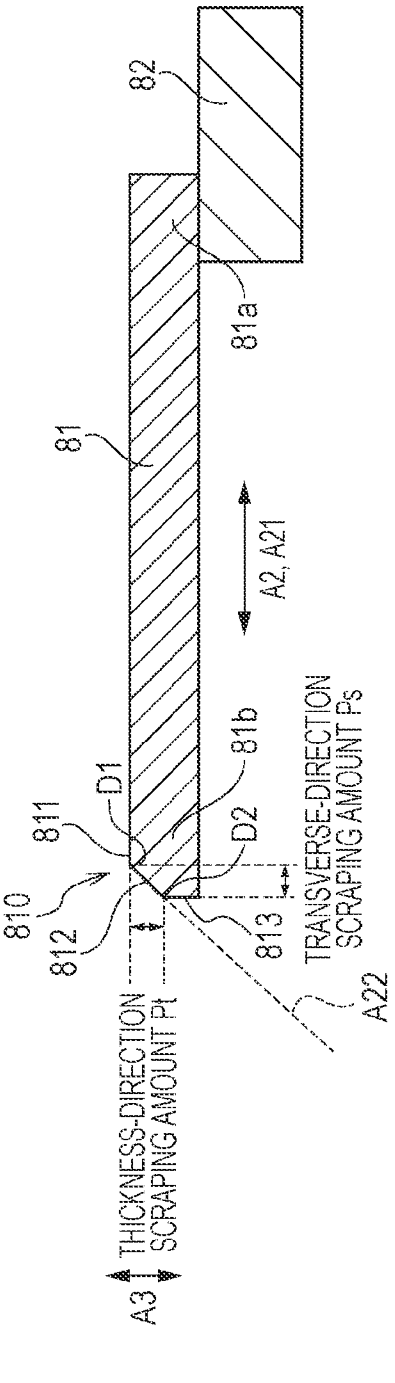
FIG. 2A is a sectional conceptual view of the developing blade according to the embodiment of the present invention in the transverse direction.
Figure 2B:
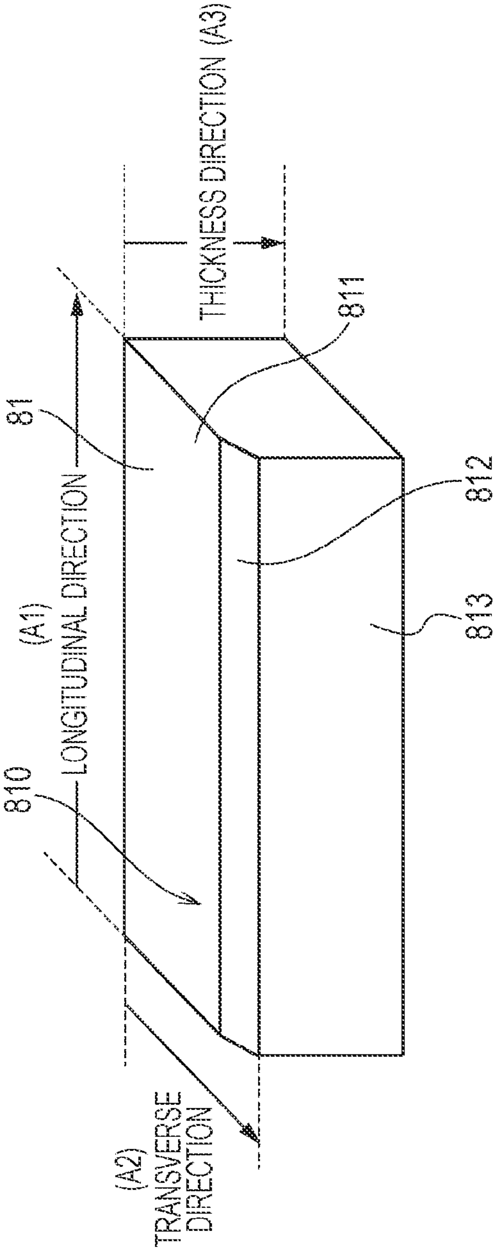
FIG. 2B is a perspective conceptual view of the developing blade according to the embodiment of the present invention in the longitudinal direction.

FIG. 2A is a sectional conceptual view of the developing blade according to an embodiment of the present invention in a transverse direction. FIG. 2B is a perspective conceptual view of the developing blade in a longitudinal direction.

In the present embodiment, as shown in FIG. 2A, the developing blade 8 includes the supporting plate 82 formed from processed stainless steel, and the thin plate 81 (blade portion) processed in the form of a leaf spring.

The thin plate 81 is integrated with the supporting plate 82 (supporting portion) by YAG laser welding.

As shown in FIG. 2B, in the present embodiment, part of an "end edge portion" (not shown) on a side to be brought into contact with the developing roller is scraped off on an end (free end) side of the thin plate 81 of the developing blade 8 by a polishing operation. A portion (second portion) formed by the scraping is formed in the entire region in the longitudinal direction A1. As shown in FIG. 2A, the polishing operation is such that, with respect to the end edge portion, a scraping amount (distance) in the transverse direction A2 is Ps and a scraping amount in a thickness direction A3 is Pt.

Specifically, in the present embodiment, the developing blade 8 includes the thin plate 81 that extends in the longitudinal direction A1 and the supporting plate 82 that supports the one end 81*a* of the thin plate 81 in the transverse direction A2 orthogonal to the longitudinal direction.

The developing blade 8 includes the contact portion 810 that is provided at the other end 81*b* (the other end portion), which is the free end of the thin plate 81, in the transverse direction A2, and that is provided for contacting the surface of the developing roller 4.

More specifically, in the present embodiment, in a cross section orthogonal to the longitudinal direction A1, the contact portion 810 has a first portion 811 (first surface) that is positioned on one side where the contact portion 810 contacts the developing roller 4, and a third portion 813 (third surface) orthogonal to the first portion 811. Before a polishing operation, the first portion (first surface) and the third portion (third surface) intersect each other and form the aforementioned "end edge portion". By the polishing operation, a second portion 812 (second surface) that connects the first portion and the third portion is formed.

That is, in the cross section orthogonal to the longitudinal direction A1, the contact portion 810 has the first portion 811 and the second portion 812.

Note that the first portion 811 extends in a first direction A21 along the transverse direction A2 and contacts the developing roller 4.

On the other hand, the second portion 812 extends further toward the free end from an end D1 of the first portion 811, and extends in a second direction A22 intersecting the first direction A21.

An imaginary line B1 that is orthogonal to the first direction A21 and that passes through an end D2 of the second portion 812 intersects an extension line B2 of the first portion 811 in the first direction A21 (intersection point D3). A region demarcated by connecting the intersection point D3, the end D1 of the first portion 811, and the end D2 of the second portion 812 by straight lines (three imaginary lines) can be defined as a "take—in region (first region)".

In the present embodiment, in the longitudinal direction A1, the area of a take—in region S2 on an end portion side ES of the thin plate 81 is smaller than the area of a take—in region S1 on a central side CS positioned inwardly of the end portion side.

Next, a method of polishing the thin plate 81 is described using FIG. 3.

FIGS. 3A to 3D each illustrate a method of polishing the developing blade according to an embodiment of the present invention.

Figure 3A:
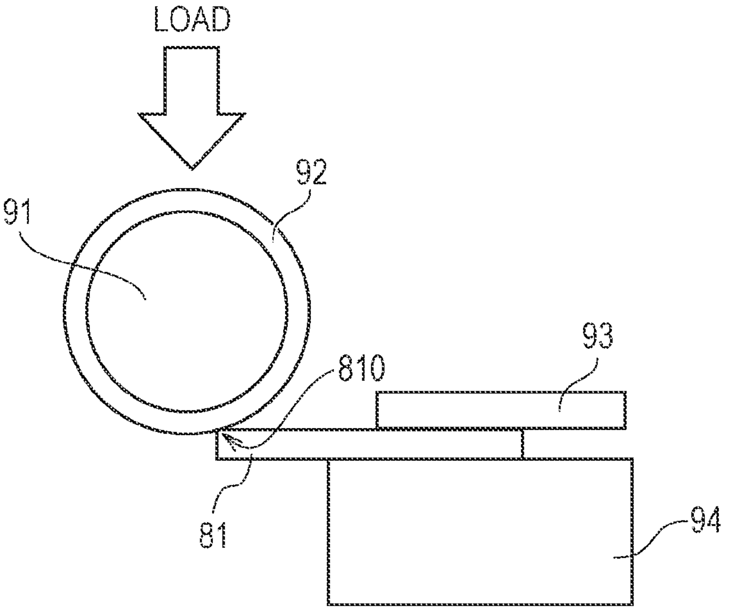
FIGS. 3A to 3D each illustrate a method of polishing the developing blade according to an embodiment of the present invention.

As shown in FIG. 3A, the thin plate 81 before being joined to the supporting plate 82 is fixed to a base 94 by being interposed between the base 94 and a holding member 93. A polishing film 92 wound around a rubber roller 91 contacts an end portion of the thin plate 81 while the polishing film 92 is subjected to a load. In the present embodiment, a wrapping film sheet having a granularity of #800 is used for the polishing film 92, and a load of 500 g is applied to the rubber roller 91.

Figure 3B:
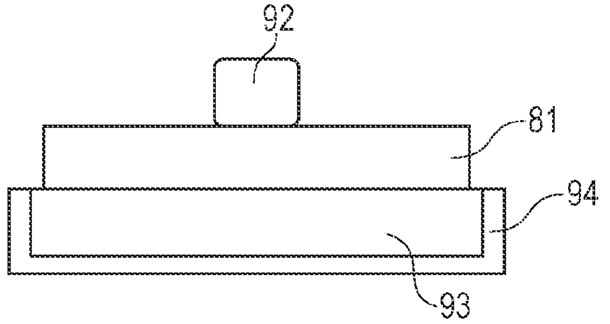
Figure 3C:
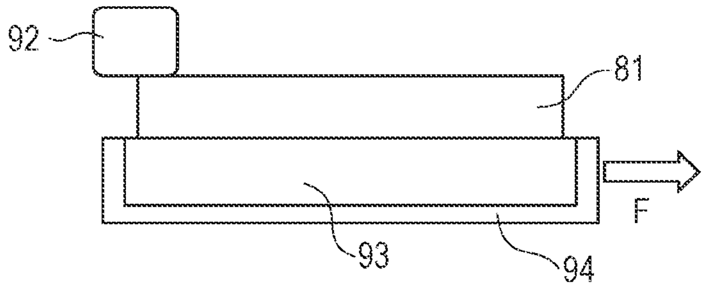
Figure 3D:
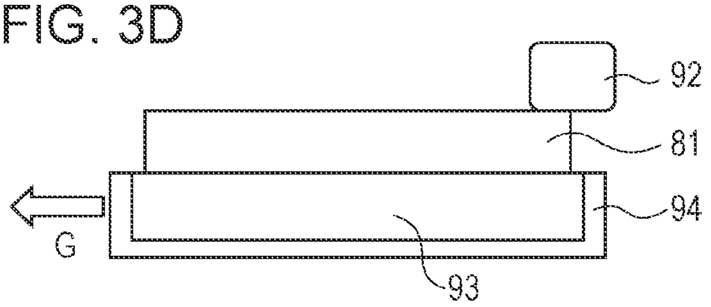

The polishing film 92 on the rubber roller 91 is disposed in a fixed state. As shown in FIGS. 3B, 3C, and 3D, due to the base 94 moving toward the left and right in a longitudinal direction F and a direction G, the end portion of the thin plate 81 is rubbed against the polishing film 92 and is finely scraped. Since the thin plate 81 is micromachined by polishing, occurrence of a cut piece when forming the shape is very slight.

The scraping amount of the thin plate 81 is proportional to the rubbing distance with respect to the polishing film 92. The larger the rubbing distance, the larger the scraping amount, and the smaller the rubbing distance, the smaller the scraping amount. That is, by controlling the movement amount of the base 94, the rubbing amount between the thin plate 81 and the polishing film 92 can be changed longitudinally, and, thus, the scraping amount can be controlled. As in the present embodiment, when the scraping amount of two end portions of the thin plate 81 is to be reduced, the rubbing distance of the two end portions against the polishing film 92 is made smaller than the rubbing distance of the other portions against the polishing film 92.

Figure 4:
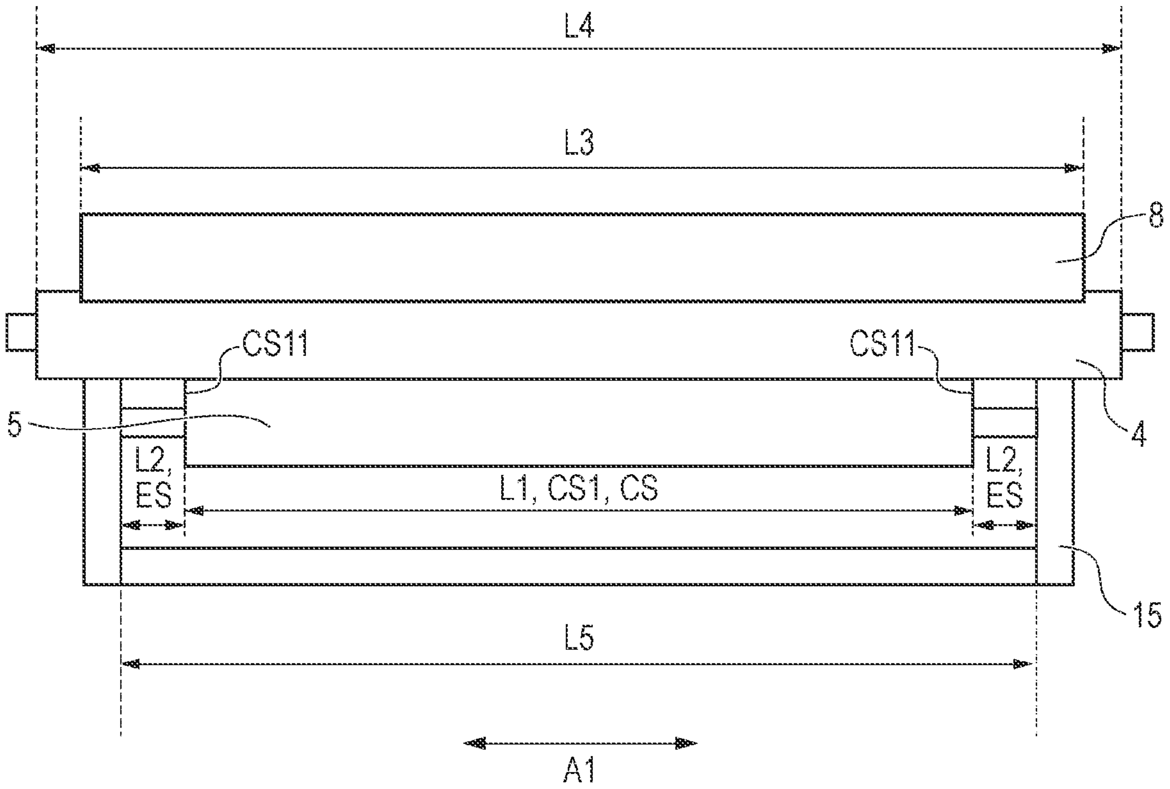
FIG. 4 shows dimensional relationships in the longitudinal direction between members that constitute a developing unit according to an embodiment of the present invention.

Next, the relationship of a longitudinal arrangement of each member is described using FIG. 4.

FIG. 4 shows dimensional relationships in the longitudinal direction between members that constitute the developing unit according to an embodiment of the present invention.

With respect to a length L4 (235 mm) in the longitudinal direction of the developing roller 4, the supply roller 5 contacts the surface of the developing roller 4 in a range (region CS1 on the central side CS) of a length L1 (220 mm) in the longitudinal direction, and the developing blade 8 is disposed in contact with the surface of the developing roller 4 in a range of a length L3 (230 mm) in the longitudinal direction. A developing chamber frame 15 filled with toner has an opening (developing opening) having a length L5

(226 mm) (opening width) in the longitudinal direction, and the developing roller 4 is disposed so as to face the developing opening. Therefore, the developing roller 4 can carry toner in a length in the longitudinal direction corresponding to the developing opening width (L5).

In order to prevent the supply roller 5 from being deformed or damaged due to an end portion of the supply roller 5 rotating while being in contact with an inner wall of the developing opening, 3 mm long gaps in the longitudinal direction are provided, one on each side between the supply roller 5 and the developing chamber frame.

Although toner with which the developing roller 4 is coated is conveyed to a developing region to perform a developing operation, toner that was not used for the developing operation is removed by the supply roller 5, and part of the removed toner is supplied again, together with new toner inside the developing chamber 14, to the developing roller 4 by the supply roller 5.

Since the supply roller 5 does not contact the developing roller 4 in each region having a longitudinal width L2 (on the end portion side ES), the supply roller 5 does not perform a removing operation in these regions. Therefore, a toner coating portion of the developing roller 4 at each L2 position is such that the toner coating gradually accumulates, and, thus, a toner coating layer at each portion having the longitudinal width L2 becomes thick. Therefore, the toner coating portion of each portion having the longitudinal width L2 can no longer have a normal electric charge, as a result of which toner scattering or toner dripping occurs.

The matters above can be mitigated by changing the cross-sectional areas of the shapes of the toner take—in regions (S1, S2), formed by the thin plate 81 and the developing roller 4, at a longitudinal-contact-position L1 portion (a region on the central side CS) of the supply roller 5 and at each longitudinal-non-contact-position-L2 portion (region on the end portion side ES) of the supply roller 5.

Next, the scraping amount of the developing blade is described in detail with reference to FIGS. 1A to 1D.

Figure 1A:
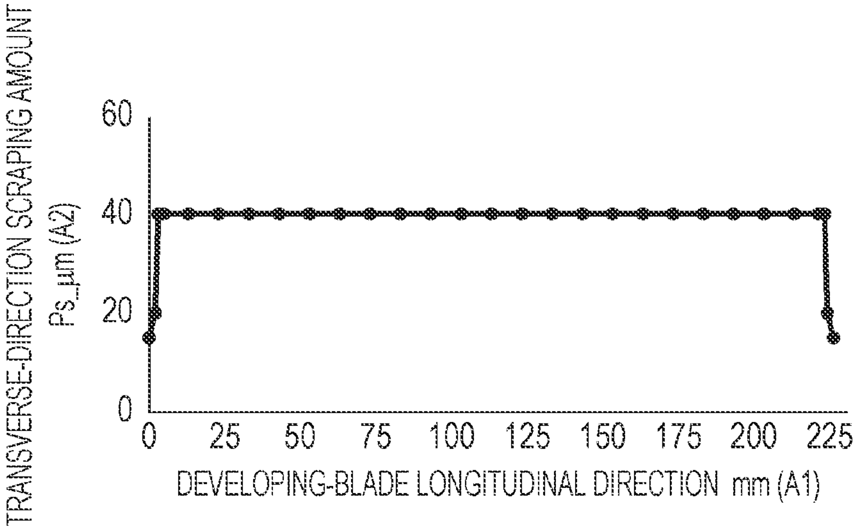
FIG. 1A is a conceptual view that illustrates a transverse-direction scraping amount in a longitudinal direction of a developing blade according to an embodiment of the present invention.

FIG. 1A is a conceptual view that illustrates a transverse-direction scraping amount in the longitudinal direction of the developing blade according to the embodiment of the present invention.

Figure 1B:
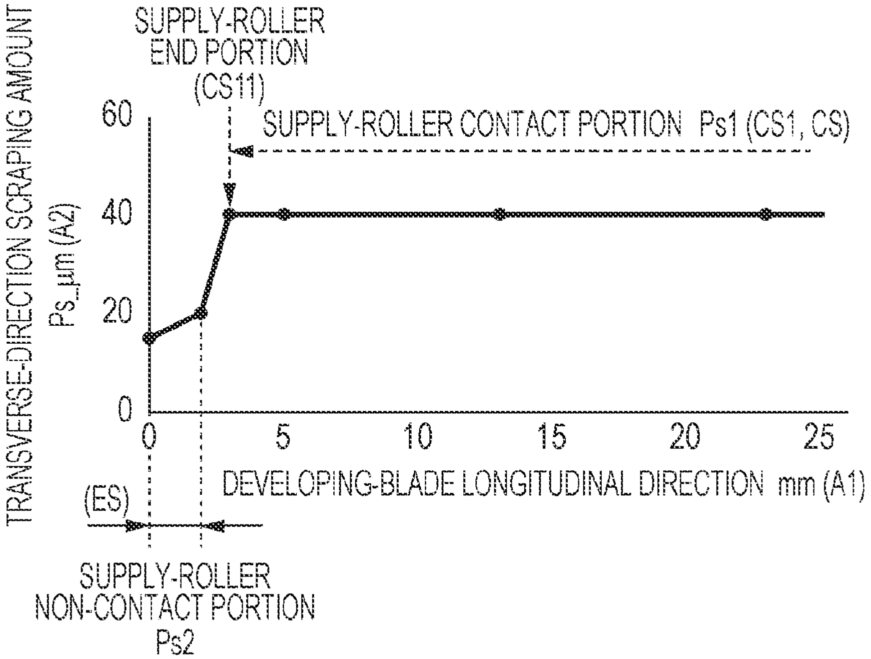
FIG. 1B is an enlarged conceptual view of an end portion side shown in FIG. 1A.

FIG. 1B is an enlarged conceptual view of an end portion side shown FIG. 1A.

Figure 1C:
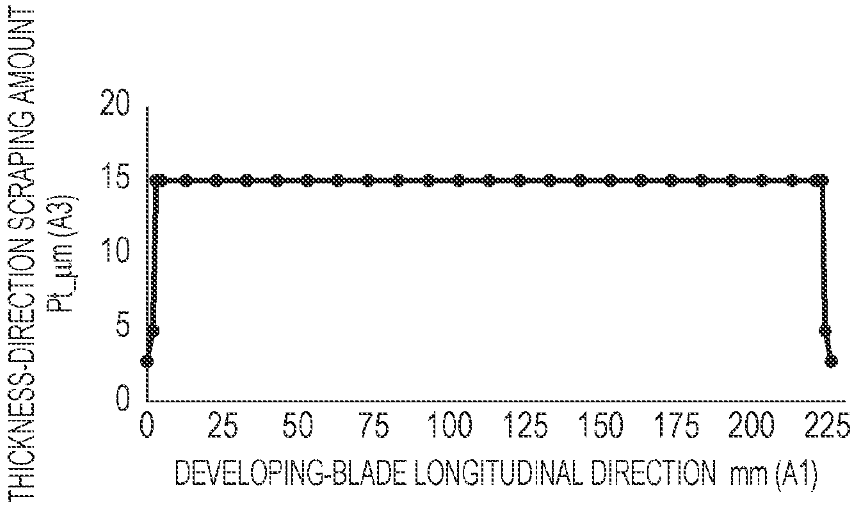
FIG. 1C is a conceptual view that illustrates a thickness-direction scraping amount in the longitudinal direction of the developing blade.

FIG. 1C is a conceptual view that illustrates a thickness-direction scraping amount in the longitudinal direction of the developing blade.

Figure 1D:
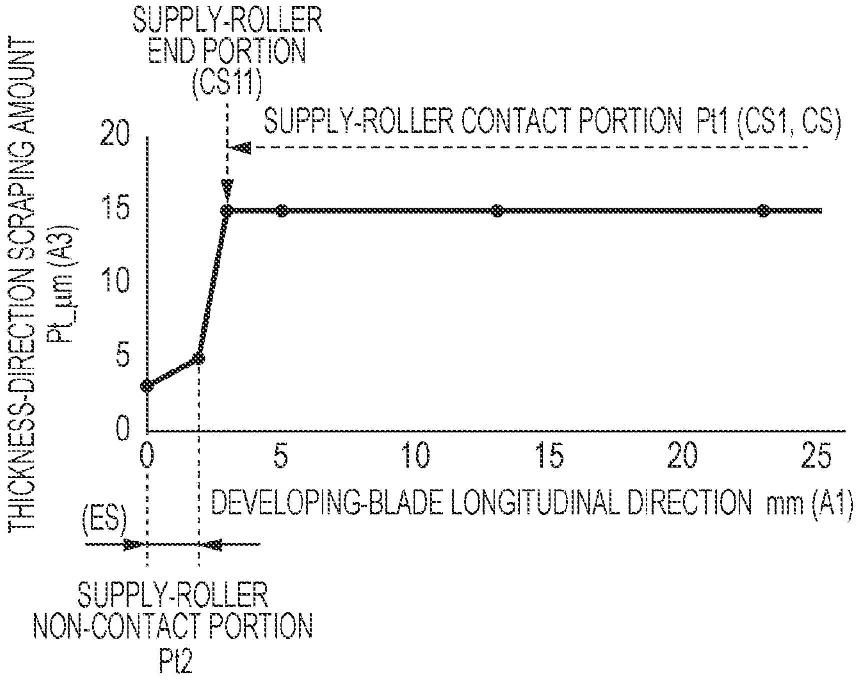
FIG. 1D is an enlarged conceptual view of an end portion side shown in FIG. 1C.

FIG. 1D is an enlarged conceptual view of an end portion side shown FIG. 1C.

That is, FIGS. 1A to 1D are graphs of longitudinal scraping amounts of a contact surface portion of the thin plate 81 of the developing blade 8 that contacts the developing roller 4 according to the present embodiment.

More specifically, FIG. 1A shows a transverse-direction scraping amount Ps of the thin plate 81, and FIG. 1B shows the transverse-direction scraping amount Ps of a portion extending from 0 mm to 25 mm in the longitudinal direction, that is, one end portion in FIG. 1A.

FIG. 1C shows a thickness-direction scraping amount Pt of the thin plate 81. FIG. 1D shows the thickness-direction scraping amount Pt of a portion extending from 0 mm to 25 mm in the longitudinal direction, that is, one end portion in FIG. 1C. Note that a laser microscope VK-X200 (manufactured by Keyence Corp.) is used for measuring the scraping amounts.

In the present embodiment, as shown in FIGS. 1B and 1D, scraping amounts Ps1 and Pt1 of the longitudinal-contact-position-L1 portion (region on the central side CS1), where the supply roller 5 contacts the developing roller 4, differs from scraping amounts Ps2 and Pt2 of a longitudinal-non-contact-position-L2 portion (region on the end portion side ES), where the supply roller 5 does not contact the developing roller 4.

Specifically, Ps2 ($40\ \mu m < Ps2 < 15\ \mu m$) is smaller than Ps1 (approximately 40 $\mu m$), and Pt2 ($15\ \mu m < Pt2 < 3\ \mu m$) is smaller than Pt1 (15 $\mu m$).

In other words, when performing a polishing operation, on the central side CS, the scraping amount in the transverse direction A2 is Ps1, and the scraping amount of the thin plate 81 in the thickness direction A3 is Pt1. On the end portion side ES, the scraping amount in the transverse direction A2 is Ps2. The scraping amount of the thin plate 81 in the thickness direction A3 is Pt2. Here, the contact portion 810 of the thin plate 81 is constituted so as to satisfy the relationship Ps1>Ps2 and the relationship Pt1>Pt2.

Such a structure provides the following effects.

Figure 5A:
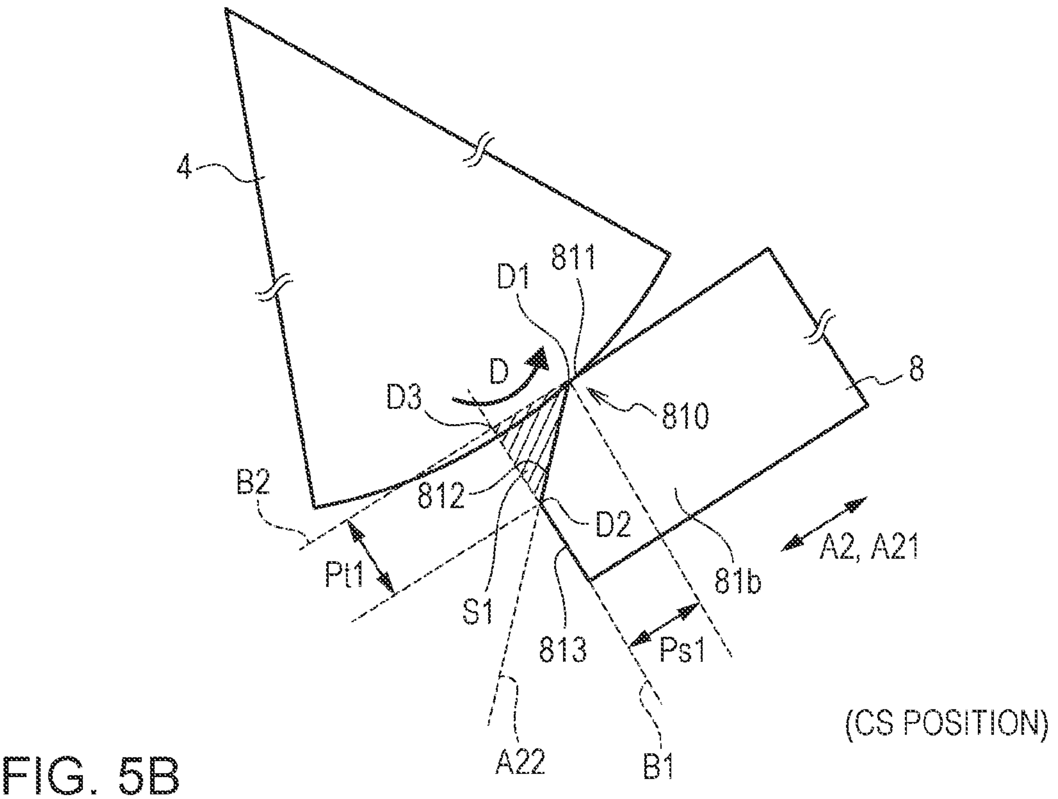
FIG. 5A illustrates a contact state on a central side between a developing roller and the developing blade in the developing unit according to the embodiment of the present invention.
Figure 5B:
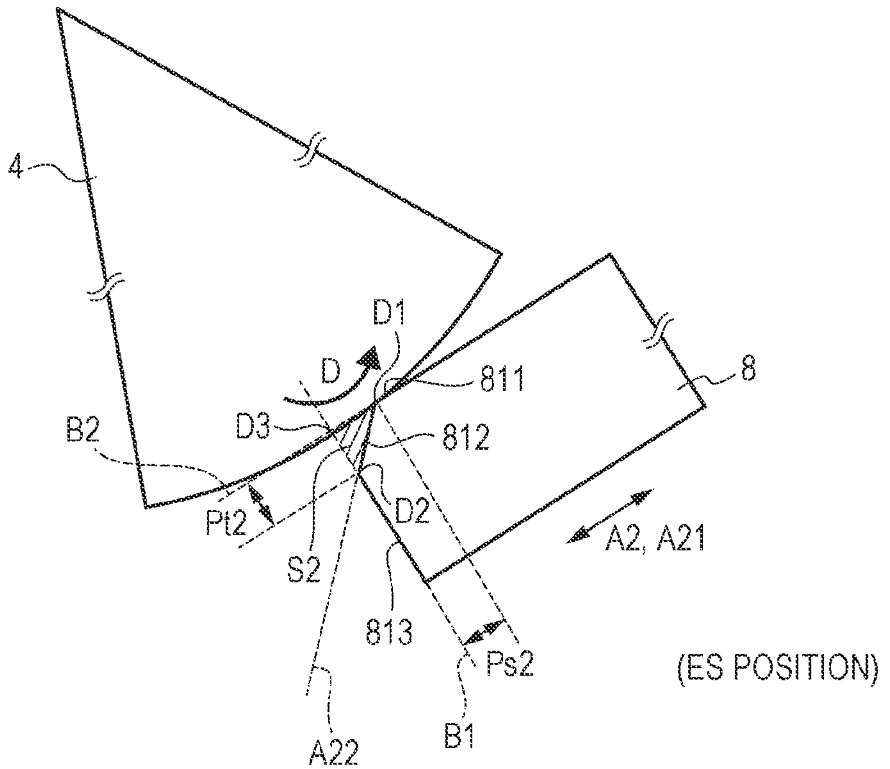
FIG. 5B illustrates a contact state on an end portion side between the developing roller and the developing blade in the developing unit according to the embodiment of the present invention.

FIG. 5A illustrates a contact state on the central side between the developing roller and the developing blade in the developing unit according to the embodiment of the present invention. FIG. 5B illustrates a contact state on the end portion side between the developing roller and the developing blade.

Specifically, FIG. 5A shows a vertical cross section of the contact portion of the developing blade 8 at the L1 portion, where the supply roller 5 contacts the developing roller 4, in the longitudinal direction. FIG. 5B shows a vertical cross section of the contact portion of the developing blade 8 at the L2 portion, where the supply roller 5 does not contact the developing roller 4, in the longitudinal direction. Note that the take—in region S1 (hatched portion) shown in FIG. 5A and the take—in region S2 (hatched portion) shown in FIG. 5B are each a region that is interposed between the developing roller 4 and the developing blade 8 and that is provided for taking in toner that flows in a movement direction of the surface of the developing roller. The cross-sectional areas of the take—in regions (shapes) in the present embodiment are calculated by using the transverse-direction scraping amount Ps and the thickness-direction scraping amount Pt.

In particular, as shown in FIG. 1B, on the end portion side ES, the scraping amount Ps2 in the transverse direction A2 decreases toward an outer side in the longitudinal direction A1. As shown in FIG. 1D, on the end portion side ES, the scraping amount Pt2 in the thickness direction A3 decreases toward the outer side in the longitudinal direction A1.

In the present embodiment, the cross-sectional area of the take—in region S1 (shape) at the contact position of the supply roller 5 in FIG. 5 is approximately 300 $\mu m^2$, and the cross-sectional area of the take—in region S2 (shape) at the non-contact position of the supply roller 5 is approximately 50 $\mu m^2$.

In other words, in the present embodiment, in the longitudinal direction A1, the end portion side ES is situated outward of an end portion CS11 of the region CS1, which contacts the developing roller 4, of the supply roller 5. In the longitudinal direction A1, the central side CS is situated inward of the end portion CS11 of the region CS1, which contacts the developing roller 4, of the supply roller 5.

By causing the area of the take—in region S1 corresponding to the central side to be larger than the area of the take—in region S2 corresponding to the end portion side, toner that is normally supplied by the supply roller 5 is stably supplied to the take—in regions of the developing blade 8. Toner that was not used in a developing operation is removed by the supply roller 5.

On the other hand, by causing the cross-sectional area of the toner take—in region S2 (shape) of the longitudinal-non-contact-position-L2 portion, where the supply roller 5 does not contact the developing roller 4, to be small, a restricting force can be increased. Therefore, although toner tends to accumulate due to the supply roller 5 not performing a removing operation at the L2 portion, where the supply roller 5 does not contact the developing roller 4, an increase in thickness of a toner coating layer can be suppressed by the restricting force of the developing blade 8 due to the take—in region (shape) of the developing blade 8 being small.

Evaluation Tests

Using the developing unit 3 and the image forming apparatus 100 according to the present embodiment, the uniformity in a longitudinal direction of a toner coating on the developing roller 4 was checked. The evaluation condition was continuous printing of images on up to 10000 A4-sized sheets at a printing ratio of 2%, and the evaluation environment was 25° C./50% RH.

Next, the embodiment of the present invention is compared with a comparative example shown in FIGS. 8A and 8B and FIGS. 9A to 9D.

Figure 8A:
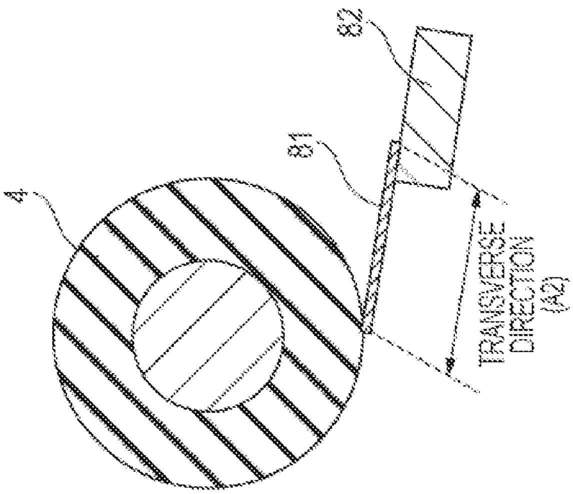
FIG. 8A Prior Art
FIG. 8A is a sectional view in a transverse direction of a developing unit according to a comparative example of the present invention.
Figure 8B:
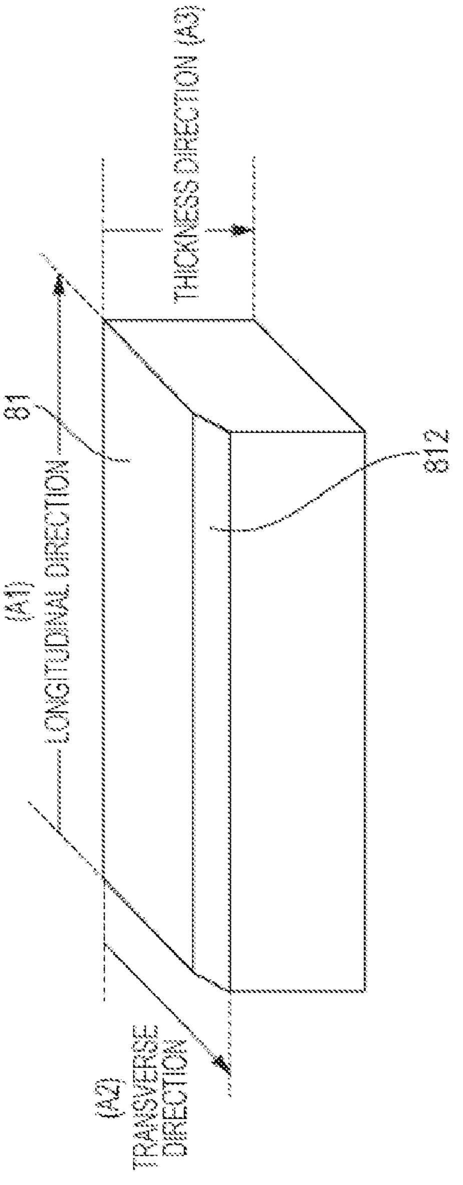
FIG. 8B Prior Art
FIG. 8B is a perspective view in a longitudinal direction of the developing unit according to the comparative example of the present invention.

FIG. 8A is a sectional view in a transverse direction of a developing unit according to a comparative example of the present invention. FIG. 8B is a perspective view in a longitudinal direction of the developing unit according to the comparative example.

Figure 9A:
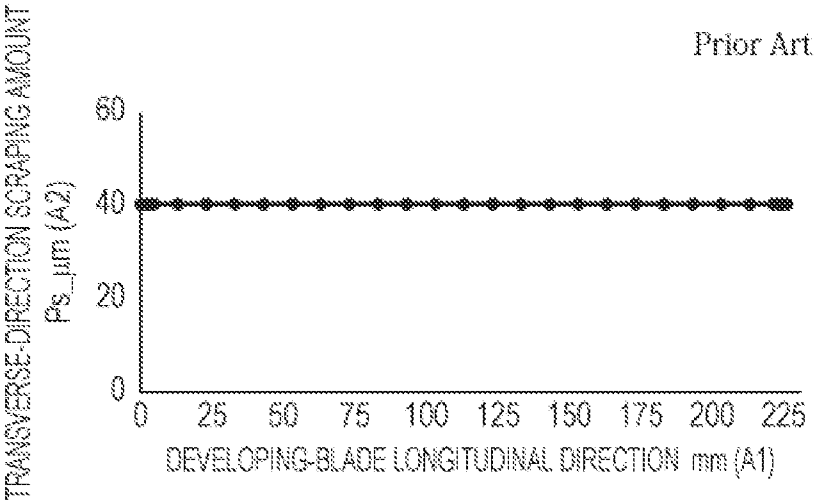
FIG. 9A illustrates a transverse-direction scraping amount in a longitudinal direction of a developing blade according to the comparative example of the present invention.
Figure 9B:
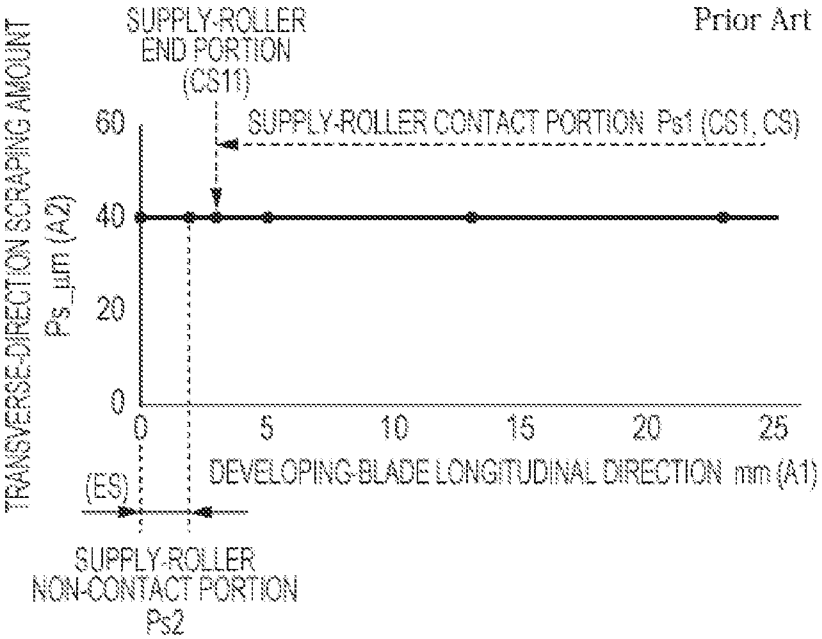
FIG. 9B is an enlarged conceptual view of an end portion side shown in FIG. 9A.

FIG. 9A illustrates a transverse-direction scraping amount in a longitudinal direction of a developing blade according to the comparative example of the present invention. FIG. 9B is an enlarged conceptual view of an end portion side shown in FIG. 9A.

Figure 9C:
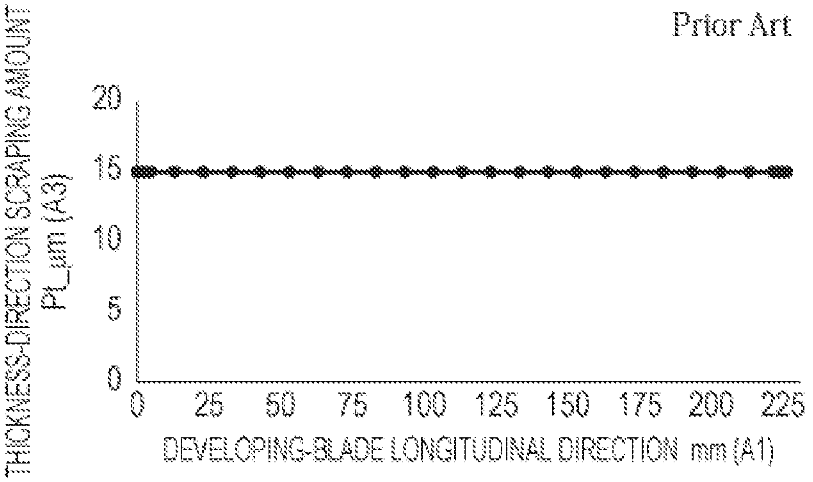
FIG. 9C illustrates a thickness-direction scraping amount in the longitudinal direction of the developing blade.
Figure 9D:
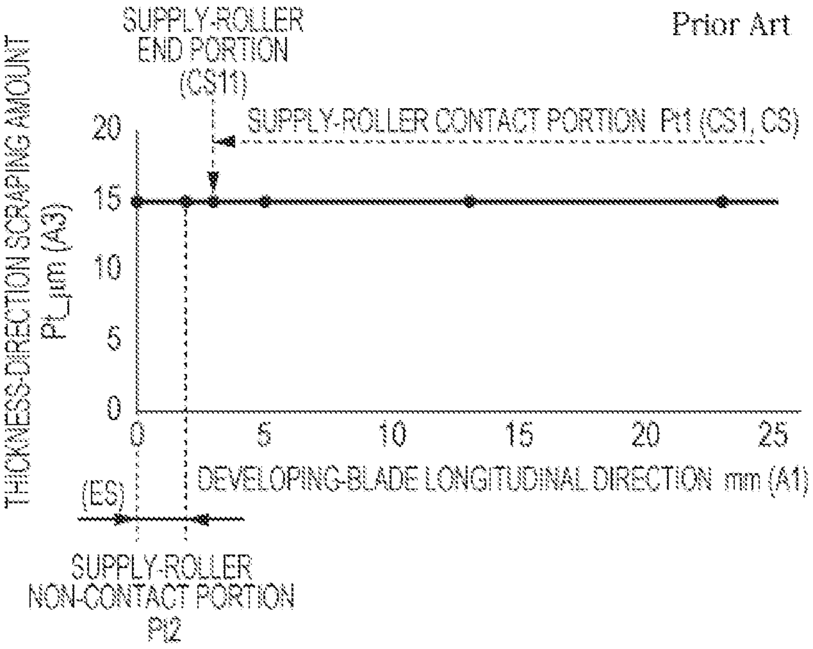
FIG. 9D is an enlarged conceptual view of an end portion side shown in FIG. 9C.

FIG. 9C illustrates a thickness-direction scraping amount in the longitudinal direction of the developing blade according to the comparative example. FIG. 9D is an enlarged conceptual view of an end portion side shown in FIG. 9C.

In the comparative example of the present embodiment, as shown in FIGS. 9A to 9D, a longitudinal scraping amount of a thin plate 81 of a developing blade 8 is uniform.

Specifically, FIG. 9A shows a transverse-direction scraping amount Ps in an entire longitudinal region of the thin plate 81. FIG. 9B shows the transverse-direction scraping amount Ps of a portion extending from 0 mm to 25 mm in the longitudinal direction, that is, one end portion in FIG. 9A. FIG. 9C shows a thickness-direction scraping amount Pt in a thickness direction of the thin plate 81. FIG. 9D shows the thickness-direction scraping amount Pt of a portion extending from 0 mm to 25 mm in the longitudinal direction, that is, one end portion in FIG. 9C.

As a result, the developing unit 3 including the developing blade 8 using the thin plate 81 according to the embodiment had a uniform toner coating layer on the developing roller in the longitudinal direction even after the evaluation ended, and toner scattering or toner dripping did not occur. This is because the restricting force increased due to the cross-sectional area of the take—in region S2 (shape) of the developing blade 8 at the L2 portion, which is situated at the non-contact position of the supply roller 5, being small.

On the other hand, in a developing unit 3 including the developing blade 8 using the thin plate 81 according to the comparative example, toner scattering or toner dripping occurred when printing was performed on 6000 sheets. This is because a supply roller 5 does not perform a removing operation on an L2 portion, which is situated at a non-contact position of the supply roller 5 that does not contact a developing roller 4, and because the restricting force of the developing blade 8 is weak, as a result of which a toner coating layer becomes thick and toner cannot have a normal electric charge.

Although, in the present embodiment, the thin plate 81 is formed of SUS, which is stainless steel, the thin plate 81 may be a phosphor bronze plate having the same shape or a thin plate that is laminated with a resin covering member, such as a polyamide elastomer covering member, as long as the contact portion thereof that contacts the developing roller 4 can be micromachined.

If the scraping amounts of a contact portion (Ps1, Pt1) of the thin plate 81 that contacts the supply roller 5 and a non-contact portion (Ps2, Pt2) of the thin plate 81 that does not contact the supply roller 5 have the relationship Ps1>Ps2 and Pt1>Ps2, effects can be provided. As absolute values of the scraping amounts, the scraping amounts of the thin plate 81 are adjusted as appropriate so that the scraping amounts become toner coating amounts on the developing roller 4 required as a system.

As described above, at the thin plate 81 of the developing blade 8, the scraping amounts of the thin plate 81 at a non-contact position of the supply roller 5 can be made smaller than the scraping amounts of the thin plate 81 at a longitudinal position that the supply roller 5 contacts. Therefore, an increase in the thickness of a toner coating layer at the non-contact position of the supply roller 5 can be suppressed. In addition, the amount of cut pieces at the time of processing that are produced during manufacturing can be reduced by forming a fine scraping shape by polishing.

Accordingly, according to the present invention, the cross-sectional area of the take—in region (shape) of the developing blade 8 at the non-contact position where the supply roller 5 does not contact the developing roller can be made smaller than the cross-sectional area of the take—in region (shape) of the developing blade at the contact position where the supply roller contacts the developing roller. Therefore, a toner coating on the developing roller can be made uniform in the longitudinal direction, and, thus, occurrence of toner scattering or toner dripping can be suppressed. Materials to be discarded at the time of manufacturing can be minimized due to micromachining by a polishing operation.

The present invention can be summarized as follows.

(1) A developing device (3) according to the present invention includes

- a developer carrying member (4) configured to carry a developer; and
- a restricting member (8) configured to restrict a thickness of a layer of the developer on the developer carrying member.

The Restricting Member Includes

- a blade portion (81) that extends in a longitudinal direction (A1); and
- a supporting portion (82) that supports a first end portion of the blade portion in a transverse direction (A2) orthogonal to the longitudinal direction.

A contact portion (810) for contacting a surface of the developer carrying member is provided at a second end portion opposite to the first end portion in the transverse direction, which includes a free end, of the blade portion in the transverse direction. In a cross section orthogonal to the longitudinal direction, the contact portion includes

- a first portion (811) that extends in a first direction (A21) along the transverse direction and that contacts the developer carrying member, and a second portion (812) that extends toward the free end from an end (D1) of the first portion on a side of the free end in a second direction (A22) intersecting the first direction so that the second portion is farther away from the surface of the developer carrying member as goes toward the free end.

When a region demarcated by connecting an intersection point, the end (D1) of the first portion, and an end (D2) of the second portion on a side of the free end in the second direction by a straight line is defined as a first region, the intersection point being where an imaginary line (B1) that is orthogonal to the first direction and that passes through the end (D2) of the second portion intersects an extension line (B2) of the first portion in the first direction, in the longitudinal direction of the blade portion, an area of the first region on a longitudinal end portion of the blade portion is smaller than an area of the first region on a longitudinal central portion of the blade portion.

(2) In the developing device according to the present invention, the second portion (812) may be formed by performing a polishing operation on the second end portion of the blade portion (81).

(3) In the developing device according to the present invention, in performing the polishing operation, when, on the longitudinal central portion of the blade portion (81), a scraping amount in the transverse direction (A2) is Ps1 and a scraping amount in a thickness direction (A3) of the blade portion (81) is Pt1, and when, on the longitudinal end portion of the blade portion (81), a scraping amount in the transverse direction (A2) is Ps2 and a scraping amount in the thickness direction (A3) of the blade portion is Pt2, $$Ps1>Ps2, \text{ and}$$

$$Pt1>Pt2.$$

(4) In the developing device according to the present invention, on the longitudinal end portion of the blade portion (81), the scraping amount Ps2 in the transverse direction (A2) decreases toward an outer side in the longitudinal direction (A1).

(5) In the developing device according to the present invention, on the longitudinal end portion of the blade portion (81), the scraping amount Pt2 in the thickness direction (A3) decreases toward the outer side in the longitudinal direction (A1).

(6) The developing device according to the present invention may include a supply member (5) configured to contact the developer carrying member (4) and to supply a developer to the developer carrying member.

In the longitudinal direction (A1), the longitudinal end portion is positioned outside a region in which the supply member contacts the developer carrying member (4), and in the longitudinal direction (A1), the longitudinal central portion is positioned inside the region in which the supply member contacts the developer carrying member (4).

(7) In the developing device according to the present invention, the developing device (3) can be configured to be attached to and detached from an image forming apparatus (100).

(8) A restricting member (8) according to the present invention includes a blade portion (81) that extends in a longitudinal direction (A1); and a supporting portion (82) that supports a first end portion of the blade portion in a transverse direction (A2) orthogonal to the longitudinal direction.

A contact portion (810) for contacting a surface of the developer carrying member is provided at a second end portion opposite to the first end portion in the transverse direction, which includes a free end, of the blade portion in the transverse direction. In a cross section orthogonal to the longitudinal direction, the contact portion includes a first portion (811) that extends in a first direction (A21) along the transverse direction and that contacts the developer carrying member, and a second portion (812) that extends toward the free end from an end (D1) of the first portion on a side of the free end in a second direction (A22) intersecting the first direction so that the second portion is farther away from the surface of the developer carrying member as goes toward the free end.

When a region demarcated by connecting an intersection point, the end (D1) of the first portion, and an end (D2) of the second portion on a side of the free end in the second direction by a straight line is defined as a first region, the intersection point being where an imaginary line (B1) that is orthogonal to the first direction and that passes through the end (D2) of the second portion intersects an extension line (B2) of the first portion in the first direction, in the longitudinal direction of the blade portion, an area of the first region on a longitudinal end portion of the blade portion is smaller than an area of the first region on a longitudinal central portion of the blade portion.

(9) A process cartridge (7) according to the present invention includes an image carrying member (1) configured to carry an image; and the developing device (3) or the restricting member (8), and the process cartridge is attached to and detached from an image forming apparatus (100).

(10) An image forming apparatus (100) according to the present invention includes a fixing member (34); and the developing device (3), the restricting member (8), or the process cartridge (7), and the image forming apparatus forms an image on a recording material (P).

According to the present invention, the uniformity in a longitudinal direction of a developer layer that is carried by the developer carrying member is increased while the efficiency of use of a raw material at the time of manufacturing is increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-106016, filed Jun. 25, 2021, which is hereby incorporated by reference herein in its entirety.

What is claimed is:

1. A developing device comprising:

(i) a developer carrying member configured to carry a-developer; and (ii) a restricting member configured to restrict a thickness of a layer of the developer on the developer carrying member, wherein the restricting member includes (ii-i) a blade portion that extends in a longitudinal direction of the developer carrying member and includes a first end portion and a second end portion opposite to the first end portion in a transverse direction orthogonal to the longitudinal direction, and (ii-ii) a supporting portion configured to support the first end portion of the blade portion, wherein the second end portion of the blade portion includes a contact portion configured to contact a surface of the developer carrying member, a first surface on which the contact portion is provided, a third surface that is an end surface on a transverse side of the second end portion in the transverse direction, and a second surface which is between the first surface and the third surface, wherein the second surface extends to an end of the third surface on a side of the developer carrying member from an end of the first surface on a side of the second end portion so that the second surface is farther away from both the first surface and the developer carrying member as the second surface goes toward the third surface, and wherein, in a case where, in a cross section orthogonal to the longitudinal direction, a region is demarcated by connecting an intersection point where an imaginary extension line of the first surface intersects an imaginary extension line of the third surface in the cross section, the end of the first surface, and the end of the third surface, an area of the at an end portion of the blade portion in the longitudinal direction is smaller than an area of the region at a central portion of the blade portion in the longitudinal direction.

2. The developing device according to claim 1, wherein the second surface is formed by performing a polishing operation on the second end portion of the blade portion.

3. The developing device according to claim 2, wherein, in performing the polishing operation, when, at the central portion of the blade portion in the longitudinal direction, a scraping amount in the transverse direction is Ps1 and a scraping amount in a thickness direction of the blade portion is Pt1, and, at the end portion of the blade portion in the longitudinal direction, a scraping amount in the transverse direction is Ps2 and a scraping amount in the thickness direction of the blade portion is $$Pt2, Ps1>Ps2, \text{ and}$$

$$Pt1>Pt2.$$

4. The developing device according to claim 3, wherein the scraping amount Ps2 in the transverse direction of the blade portion decreases toward an outer side in the longitudinal direction.

5. The developing device according to claim 4, wherein the scraping amount Pt2 in the thickness direction of the blade portion decreases toward the outer side in the longitudinal direction.

6. The developing device according to claim 1, further comprising a supply member configured to contact the developer carrying member and to supply developer to the developer carrying member, wherein, in the longitudinal direction, the end portion of the blade portion is positioned outside a range in which the supply member contacts the developer carrying member, and wherein, in the longitudinal direction, the central portion of the blade portion is positioned inside the range in which the supply member contacts the developer carrying member.

7. The developing device according to claim 1, wherein the developing device is configured to be attached to and detached from an image forming apparatus.

8. A process cartridge comprising:

an image carrying member configured to carry an image; and the developing device according to claim 1, wherein the process cartridge is configured to be attached to and detached from an image forming apparatus.

9. An image forming apparatus comprising:

a fixing member; and the developing device according to claim 1, wherein the image forming apparatus is configured to form an image on a recording material.

10. An image forming apparatus comprising:

a fixing member; and a process cartridge having an image carrying member configured to carry an image and including the developing device according to claim 1, wherein the process cartridge is configured to be attached to and detached from an image forming apparatus, and wherein the image forming apparatus is configured to form an image on a recording material.

11. The developing device according to claim 1, wherein, in the transverse direction, thickness on a side of the first surface of the second end portion of the blade portion is thicker than thickness on a side of the third surface of the second end portion of the blade portion.

12. A restricting member configured to restrict a thickness of a layer of developer on a developer carrying member, the restricting member comprising:

(i) a blade portion that extends in a longitudinal direction, and includes a first end portion and a second end portion opposite to the first end portion in a transverse direction orthogonal to the longitudinal direction; and (ii) a supporting portion configured to support the first end portion of the blade portion, wherein the second end portion of the blade portion includes a contact portion configured to contact a surface of the developer carrying member, a first surface on which the contact portion is provided a third surface that is an end surface on a transverse side of the second end portion in the transverse direction, and a second surface which is between the first surface and the third surface, wherein the second surface extends to an end of the third surface on a side of the developer carrying member from an end of the first surface on a side of the second end portion so that the second surface is farther away from both the first surface and the developer carrying member as the second surface goes toward the third surface, and wherein, in a case where, in a cross section orthogonal to the longitudinal direction, a region is demarcated by connecting an intersection point where an imaginary extension line of the first surface intersects an imaginary extension line of the third surface in the cross section, the end of the first surface, and the end of the third surface, an area of the region at an end portion of the blade portion in the longitudinal direction is smaller than an area of the region at a central portion of the blade portion in the longitudinal direction.

13. A process cartridge comprising:

an image carrying member configured to carry an image; and the restricting member according to claim 12, wherein the process cartridge is configured to be attached to and detached from an image forming apparatus.

14. An image forming apparatus comprising:

a fixing member; and the restricting member according to claim 12, wherein the image forming apparatus is configured to form an image on a recording material.

15. The restricting member according to claim 12, wherein, in the transverse direction, thickness on a side of the first surface of the second end portion of the blade portion is thicker than thickness on a side of the third surface of the second end portion of the blade portion.

* * * * *